Patented Mar. 16, 1937

2,073,759

UNITED STATES PATENT OFFICE 2,073,759

MANUFACTURE OF POLYMETHINE DYES

Wilhelm Schneider, Dessau in Anhalt, Germany, assignor to Agfa Ansco Corporation, Binghamton, N. Y., a corporation of New York No Drawing. Application October 23, 1934, Serial No. 749,669. In Germany January 19, 1932

8 Claims. (Cl. 260—53)

My present invention relates to the manufacture of dyes of the polymethine series. It is a continuation-in-part of my co-pending application Ser. No. 651,846, filed Jan. 14, 1933.

In that application I have disclosed the manufacture of dyes of the general formula

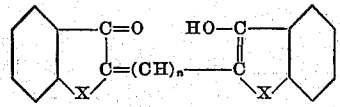

wherein X stands for S and Se, and $n$ stands for 1, 2 or 3, and their use as sensitizers for sensitizing photographic silver halide emulsions.

It is one of the objects of the present invention to describe and claim the dyes of the general formula

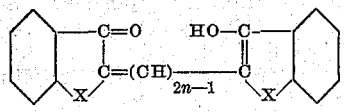

wherein X stands for S and Se, and $n$ stands for 2 or 3 which have not been claimed in my above application. Another object is the process of manufacturing the dyes. Further objects will be seen from the detailed specification following hereafter.

The dyes according to this invention may be prepared by condensing an hydroxythionaphthene or an hydroxyselenonaphthene with an α-phenylamido-γ-phenylimidopropen hydrohalide or by the condensation of an hydroxythionaphthene or an hydroxyselenonaphthene with an α-phenylamido-ε-phenylimido-α.γ-pentadiene hydrohalide. In the first instance there are obtained compounds in which the nuclei are linked together by a trimethenyl chain and in the second instance the nuclei are linked together by a pentamethenyl chain. When using a suitable substituted propen compound or pentadiene compound substituents may be introduced in the polymethenyl chain of the dyes. The condensation is carried out with the use of organic base, such as triethylamine, diethylamine, sodium ethylate or piperidine as condensing agent at an elevated temperature.

The dyes according to this invention are suitable for sensitizing photographic silver halide emulsions to waves from about 600μμ to 870μμ. The dyes are preferably incorporated in the finished photographic material. Thus, for instance the finished emulsion may be bathed in a solution of 1 mgr. of dye in 100 cc. of an aqueous solution of methanol of 50 per cent strength to which a small amount of ammonia has been added.

The following examples illustrate the invention.

Example 1.—The dye corresponding with the following formula

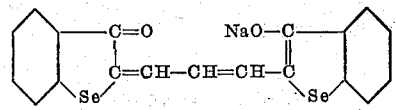

may be prepared by boiling 2 grams of acetyl-hydroxyselenonaphthene with 1 gram of α-phenylamido-γ-phenylimidopropen hydrochloride, and continuing boiling for 10 minutes after the addition of 10 cc. of an alcoholic solution of sodiumethylate (containing 3% of sodium). The mixture assumes a dark green color. After cooling the dye is precipitated in form of bright green crystals on the addition of about 30 cc. of ether.

The solution of the dye in methanol has an absorption maximum at a wave length of about 660μμ.

A silver halide emulsion is sensitized for waves from about 600μμ to about 750μμ with a maximum at about 690μμ by incorporation of the dye.

Example 2.—The dye corresponding with the following formula

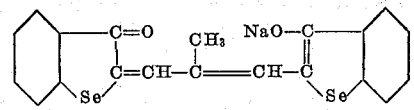

may be prepared by boiling 1 gram of acetyl-hydroxyselenonaphthene and 0.5 grams of α-phenylamido-γ-phenylimido-β-methylpropen hydrochloride in 10 cc. of alcohol and adding 2 cc. of an alcoholic solution of sodium ethylate of 3 per cent strength. Boiling is continued until the mixture assumes a dark green color. The dye is precipitated by the addition of a solution of sodium chloride in form of green flakes.

The solution of the dye in methanol containing a slight amount of ammonia has an absorption maximum at a wave length of about 670μμ.

A silver halide emulsion is rendered sensitive to waves from about 600μμ to 730μμ with a maximum at about 690μμ, by incorporation of the dye.

Example 3.—The dye corresponding with the following formula

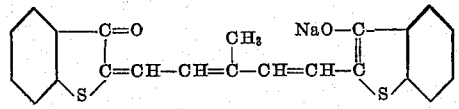

may be made by dissolving 2 grams of hydroxythionaphthene and 1 gram of α-phenylamido-ε-phenylimido-γ-methyl-α.γ-pentadiene hydrochloride in 20 cc. of hot alcohol. After the addition of 3 cc. of diethylamine the mixture is boiled until it assumes a blue green color. The sodium salt of the dye is precipitated in the form of green flakes on the addition of sodium chloride.

A silver halide emulsion is sensitized for waves from about 600μμ to about 870μμ with a maximum at about 790μμ by incorporation of the dye.

*Example 4.*—The dye corresponding with the following formula

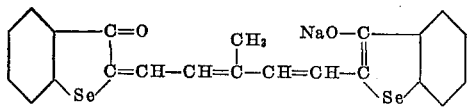

may be made analogously to the method described in Example 3 when using the seleno compound instead of the thio compound.

A silver halide emulsion is sensitized for waves from about 600μμ to about 870μμ with a maximum at about 790μμ by incorporation of the dye.

What I claim is:

1. A dye of the polymethine series corresponding with the formula

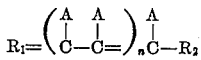

wherein $R_1$ stands for one of the group consisting of oxothionaphthene and oxoselenonaphthene, $R_2$ for one of the group consisting of hydroxythionaphthene and hydroxyselenonaphthene. A stands for one of the group consisting of H and methyl. $n$ stands for 1 or 2.

2. The dye corresponding with the formula

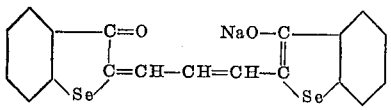

having in its methanolic solution an absorption maximum at about 660μμ and capable of sensitizing a silver halide emulsion for waves from about 600μμ to about 750μμ with a maximum at about 690μμ.

3. The dye corresponding with the formula

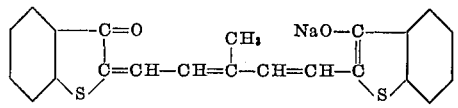

and capable of sensitizing a silver halid emulsion for waves from about 600μμ to 870μμ with a maximum at about 790μμ.

4. The dye corresponding with the formula

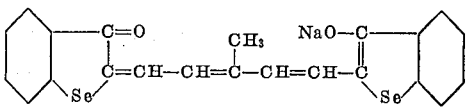

and capable of sensitizing a silver halide emulsion for waves from about 600μμ to 870μμ with a maximum at about 790μμ.

5. The process of manufacturing a dye of the polymethine series which comprises condensing a compound selected from the group consisting of hydroxythionaphthenes and hydroxyselenonaphthenes with a compound selected from the group consisting of an α-phenyl-amido-γ-phenyl-imidopropen hydrohalide and an α-phenylamido-ε-phenylimido-α.γ-pentadiene hydrohalide in the presence of an organic base as a condensing agent, in a boiling solvent.

6. The process of manufacturing a dye of the polymethine series which comprises boiling a mixture of acetylhydroxyselenonaphthene, α-phenylamido-γ-phenylimidopropen hydrochloride, alcohol and sodiumethylate until the mixture assumes a dark green color, and precipitating the formed dye.

7. The process of manufacturing a dye of the polymethine series which comprises boiling a mixture of hydroxythionaphthene, α-phenylamido-ε-phenylimido-α.γ-pentadiene hydrochloride, alcohol and diethylamine until the mixture assumes a blue green color, and precipitating the formed dye.

8. The process of manufacturing a dye of the polymethine series which comprises boiling a mixture of hydroxyselenonaphthene, α-phenylamido-ε-phenylimido-α.γ-pentadiene hydrochloride, alcohol and diethylamine until the mixture assumes a blue green color, and precipitating the formed dye.

WILHELM SCHNEIDER.